(12) United States Patent
Alsaiari et al.

(10) Patent No.: US 11,867,546 B2
(45) Date of Patent: Jan. 9, 2024

(54) METHOD AND SYSTEM FOR WIRELESS FLOW SENSING OF MANUALLY OPERATED VALVES

(71) Applicant: SAUDI ARABIAN OIL COMPANY, Dhahran (SA)

(72) Inventors: Mishal Alsaiari, Abqaiq (SA); Abdulaziz Moshaweh, Abqaiq (SA); Mohammed A. Batouq, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 18 days.

(21) Appl. No.: 17/648,373

(22) Filed: Jan. 19, 2022

(65) Prior Publication Data
US 2023/0228605 A1    Jul. 20, 2023

(51) Int. Cl.
| | |
|---|---|
| *G01F 1/667* | (2022.01) |
| *G01F 1/34* | (2006.01) |
| *G01F 1/00* | (2022.01) |
| *G01F 1/86* | (2006.01) |
| *G01F 1/66* | (2022.01) |

(52) U.S. Cl.
CPC .............. *G01F 1/668* (2013.01); *G01F 1/34* (2013.01); *G01F 1/00* (2013.01); *G01F 1/66* (2013.01); *G01F 1/86* (2013.01)

(58) Field of Classification Search
CPC . G01F 1/668; G01F 1/34; G01F 22/02; G01F 1/00; G01F 1/86; G01F 1/66
See application file for complete search history.

(56) References Cited

U.S. PATENT DOCUMENTS 4,953,618 A * 9/1990 Hamid ............... E21B 49/008
                                                 166/305.1
10,168,691 B2    1/2019 Zornio et al.
(Continued)

FOREIGN PATENT DOCUMENTS

| JP | 2012128870 A | 7/2012 |
|---|---|---|
| JP | 5570293 B2 | 8/2014 |
| RU | 2251612 C1 | 5/2005 |

OTHER PUBLICATIONS

"TransPort® PT900; PT900 portable ultrasonic flow meter for liquids" Panametrics; Jun. 2021 (7 pages).

*Primary Examiner* — Peter J Macchiarolo
*Assistant Examiner* — John M Royston
(74) *Attorney, Agent, or Firm* — Osha Bergman Watanabe & Burton LLP

(57) ABSTRACT

A system includes upstream process equipment and downstream process equipment. The upstream process equipment is configured to transmit a predetermined fluid to the downstream process equipment. A manually operated valve fluidly couples the upstream process equipment to the downstream process equipment. A removable ultrasonic wireless flow meter is coupled to piping downstream from the manually operated valve. A control system is coupled to the manually operated valve and the removable ultrasonic wireless flow meter. The control system determines an optimum time and speed to actuate the manually operated valve using a predictive model based on a valve size of the manually operated valve, a valve age of the manually operated valve, fluid type, a criticality index of the manually operated valve, a measured flow rate from the removable ultrasonic wireless flow meter, and corresponding coefficients.

15 Claims, 5 Drawing Sheets

(56) References Cited

U.S. PATENT DOCUMENTS

| | | |
|---|---|---|
| 11,017,321 B1 | 5/2021 | Mishra et al. |
| 2018/0283148 A1 | 10/2018 | Ortiz |
| 2019/0236447 A1 | 8/2019 | Cohen et al. |
| 2020/0340848 A1 | 10/2020 | Alkhabbaz |
| 2021/0062935 A1 | 3/2021 | Saban et al. |
| 2021/0088186 A1 | 3/2021 | Yanagida et al. |
| 2021/0096050 A1 | 4/2021 | Haeusler et al. |
| 2021/0180713 A1 | 6/2021 | Mariano |

\* cited by examiner

METHOD AND SYSTEM FOR WIRELESS FLOW SENSING OF MANUALLY OPERATED VALVES

BACKGROUND

Manually operated valves are used in a wide variety of industries to stop, start, and direct a fluid flow in a conduit. For example, the manually operated valve is directly actuated (for example, mechanically actuating an actuation device of the valve such as pushing a lever or rotating a wheel) to close or open thereby stopping or permitting fluid flow in a piping circuit. However, during shutdown and start up in the piping circuit, and while operating the manually operated valves, operation personnel may mistakenly open the valve in a rush that will cause huge flux of fluid (for example, oil, steam, and water) resulting in the piping circuit to displace and move from its anchor points and supports. This will lead to severe and permanent damage or even catastrophic failures in the piping circuit. Such failures will have major implications on production, health, safety, and integrity of the facility using the piping circuit. For example, line movement in the piping circuit may cause a loss of production of around 45 days per year (15 days every year for each production line (2 production lines in oil plants and 1 in Natural gas liquids (NGL) plants)).

A flowmeter may be provided approximate the manually operated valve to measure flowrate of fluid passing through the manually operated valve. As illustrated by FIG. 1, a flowmeter 1 is installed within a pipe 2 of a piping circuit. The flowmeter 1 takes flowrate measurements of a fluid flow, see arrow 3, flowing through the pipe 2. Additionally, pressure sensors 4a, 4b positioned upstream and downstream the flowmeter 1 measure a pressure drop across the flowmeter 1. The flowmeter 1 installation requires a capital expense (CAPEX) which is a major expense for long term use. Thus, not all the pipes within the piping circuits are equipped with flowmeters. Some of the piping circuits cannot accommodate flowmeter installation because of congested area, inadequate pipe straight length, cost, and other factors. Additionally, the flowmeter 1 is required to be maintained such as preventive maintenance, obsolescence replacement program, inspections, and other non-productive time (NPT) operations. Therefore, conventional methods make it impractical to provide flowmeters at all piping circuits as the CAPEX will be greatly increased as well as increase the day-to-day operating expenses (OPEX). As such, flowrate measurement plays a vital role in the piping circuit of the plant. However, conventional methods have poor accuracy along with the flowmeter 1 increasing the overall CAPEX and OPEX of the piping circuit.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system. The system may include upstream process equipment; downstream process equipment, the upstream process equipment is configured to transmit a predetermined fluid to the downstream process equipment; a manually operated valve fluidly coupling the upstream process equipment to the downstream process equipment; a removable ultrasonic wireless flow meter coupled to piping downstream from the manually operated valve; and a control system coupled to the manually operated valve and the removable ultrasonic wireless flow meter, the control system determines an optimum time and speed to actuate the manually operated valve using a predictive model based on a valve size of the manually operated valve, a valve age of the manually operated valve, fluid type, a criticality index of the manually operated valve, a measured flow rate from the removable ultrasonic wireless flow meter, and corresponding coefficients.

In another aspect, embodiments disclosed herein relate to a method that may include obtaining, by a control system, a flow rate measured from a removable ultrasonic wireless flow meter downstream of a manually operated valve; determining, by the control system, an optimum time and speed to actuate the manually operated valve based on a predictive model based on a valve size of the manually operated valve, a valve age of the manually operated valve, fluid type, a criticality index of the manually operated valve, a measured flow rate from the removable ultrasonic wireless flow meter, and corresponding coefficients; and comparing, by the control system, the measured flow rate set points of the determined optimum timing, if the measured flow rate does exceed a predetermined limit, activating a light of the removable ultrasonic wireless flow meter and sending a notification to an operator.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for identifying optimum values for an opening/closing time and an opening/closing speed of a manually operated valve within a piping circuit using virtual flow sensing. Rather than use a purely hardware flowmeter to determine when to open or close valves, soft measurement logic may be used to analyze data utilizing prediction models to predict an optimum time and speed to open or close the manually operated valve. In some embodiments, for example, a virtual actuation measurement system determines the optimum time and speed to open or close the manually operated valve within process piping based on valve size, valve age, fluid properties, flow rate, and failure consequences. In addition, the virtual actuation measurement system includes a predictive model to utilize coefficients for the valve size, age, liquid properties, flow rate, and failure consequences to predict optimum time and speed to open or close the manually operated valve. In particular, a control system (such as a distributed control system (DCS)) may implement this virtual flow sensing in some embodiments. The control system may obtain the valve size, valve age, fluid properties, flow rate, and failure consequences, and then determine coefficients for each input based on regression models using historical data. Once the coefficients for each input is identified, the coefficients may be used to form an equation to be used in the predictive model to determine the optimum time and speed to open or close the manually operated valve. Further, the determined optimum time and speed may be cross correlated with an actual speed and time of the opening or closing of the manually operated valve and alerts may be sent in case of deviation from the determined optimum time and speed.

Figure 1:
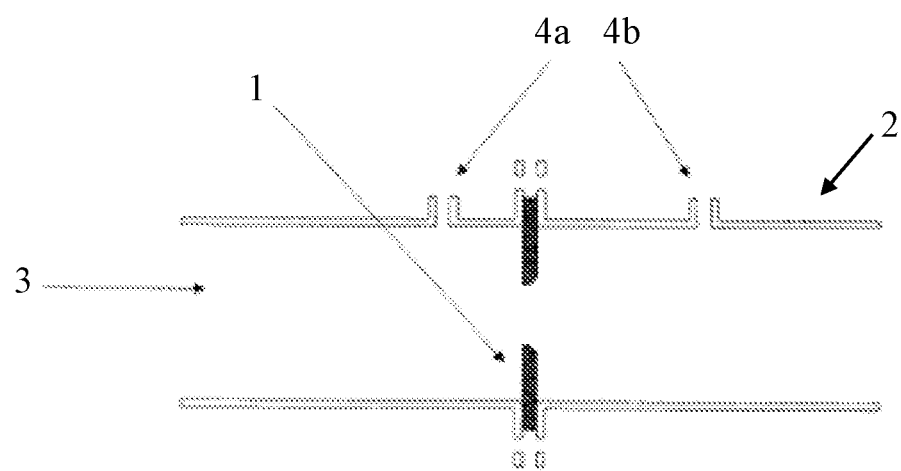
FIG. 1 illustrates a schematic diagram of a flowmeter in accordance with prior art.

Furthermore, a removable ultrasonic wireless flow meter may be used in place of cumbersome physical flow measurement devices. The removable ultrasonic wireless maybe be installed on the manually operated valve downstream piping connection to measure a desired piping flow rate based on the opening valve speed/time prediction model in the virtual actuation measurement system. Further, the removable ultrasonic wireless may continuously measure the valve actual opening time and speed, compare the results with the optimum values determined, identify if fluctuation pattern exists, and send alarms in case of fluctuation patterns. For example, the removable ultrasonic wireless may include a light that will flash when the fluctuation pattern exists and the removable ultrasonic wireless will send a wireless signal to the control system for an operator to correct the fluctuation pattern. By using the removable ultrasonic wireless flow meter, some embodiments may eliminate a need to install a hardware flowmeter within the piping circuit to measure a fluid flowrate. For example, as illustrated in FIG. 1, the hardware flowmeter 1 may include differential pressure sensors 4a, 4b and corresponding orifice plates within the piping circuit. Thus, the removable ultrasonic wireless flow meter may avoid piping modifications to a plant as well as shutting down the facility, which can result in lost plant production.

Figure 2:
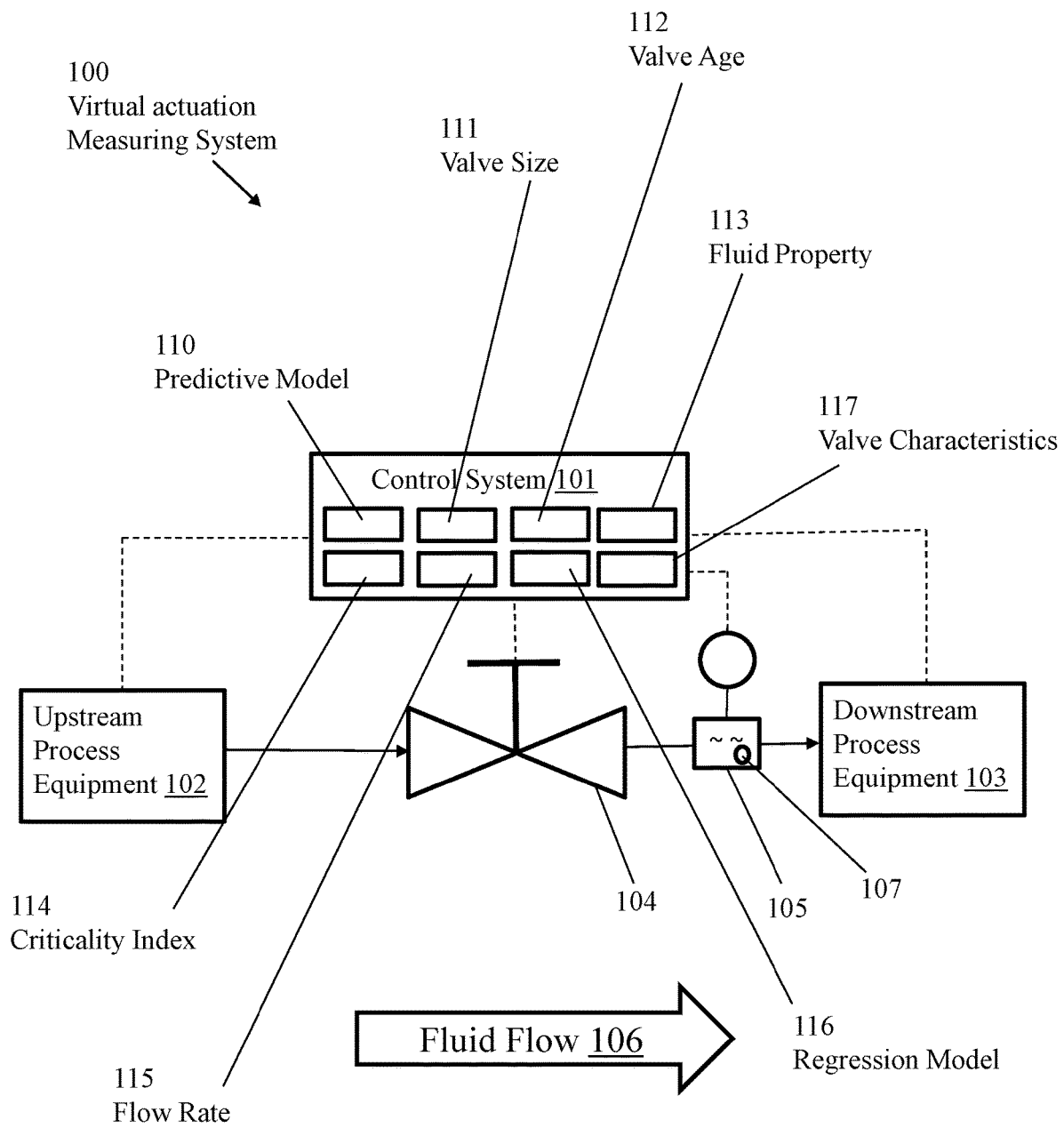
FIGS. 2 and 3 illustrate schematic depictions of a system for predictive flow measurements in a piping circuit in accordance with one or more embodiments of the present disclosure.

Turning to FIG. 2, FIG. 2 shows a schematic diagram in accordance with one or more embodiments. As shown in FIG. 2, a virtual actuation measuring system 100 may include a control system 101, one or more manually operated valves upstream process equipment 102, downstream process equipment 103, one or more manually operated valves 104, and one or more removable ultrasonic wireless flow meters 105.

As illustrated in FIG. 2, for example, the virtual actuation measuring system 100 determines an optimum time and speed to open or close the one or more manually operated valves 104 to control a fluid flow 106 of a fluid exiting the upstream process equipment 102 that passes through the one or more manually operated valves 104 to the downstream process equipment 103. The one or more manually operated valves 104 may be a closure element with hardware for opening and closing a conduit connection, such as a gate valve, a shutoff valve, a ball valve, a control valve, etc. Additionally, the one or more removable ultrasonic wireless flow meters 105 is coupled to piping downstream of the one or more manually operated valves 104 to measure a downstream fluid flow rate. Further, the one or more removable ultrasonic wireless flow meters 105 may include a light 107 (for example, an LED light) to flash when if a desired flow rate is exceeded from a high flow surge. It is further envisioned that the one or more removable ultrasonic wireless flow meters 105 may include a transmitter to wirelessly send signals to the control system 101 to alert an operator.

In some embodiments, the control system 101 in the virtual actuation measuring system 101 includes a predictive model 110. In particular, the predictive model 110 may describe one or more physical criteria or conditions for determining the optimum time and speed to open or close the one or more manually operated valves 104. For example, the predictive model 110 may specify various input parameters (for example, valve size 111, valve age 112, fluid type 113, criticality index 114, and flow rate 115) to determine the optimum time and speed to open or close the one or more manually operated valves 104. For example, valve size 111 may include an inner diameter of the one or more manually operated valves 104. The valve age 112 may include a time of use of the one or more manually operated valves 104. The fluid type 113 may include composition, molecular weights, density values, expansion factors regarding the compressibility or incompressibility of a fluid flow, etc. The criticality index 114 may include historical data of the one or more manually operated valves 104 such as performance metrics on when the one or more manually operated valves 104. The fluid rate 115 may include a fluid rate of the fluid flow 106 measured from the removable ultrasonic wireless flow meters 105.

Still referring to FIG. 2, the control system 101 in the virtual actuation measuring system 101 includes a regression model 116 to calculate coefficients for each input parameter (for example, valve size 111, valve age 112, fluid type 113, criticality index 114, and flow rate 115) to be used in the predictive model 110. The regression model 116 may be a set of statistical methods used to estimate relationships between the coefficients and each input parameter.

In some embodiments, for example, the predictive model 110 corresponds to optimum timing figures with associated factors will be collected from industry standard or historical data that is expressed using the following equation:

$$T = C1 + C2*S1 + C3*A + C4*S2 + C5*I + C6*F \qquad \text{Equation 1}$$

where T corresponds to an optimum timing to open or close the one or more manually operated valves 104, C1 corresponds to a constant, C2 corresponds to a coefficient of valve size, S1 corresponds to the valve size 111, C3 corresponds to a coefficient of valve age, A corresponds to the valve age 112, C4 corresponds to a coefficient of service, S2 corresponds to the fluid type 113, C5 corresponds to a coefficient of criticality, I corresponds to the criticality index 114, C6 corresponds to a coefficient of flow rate, F corresponds to the flow rate 115.

With respect to the control system 101, the control system 101 may include hardware and/or software that monitors and/or operates equipment, such as at a plant. In particular, the control system 101 may be coupled to facility equipment (102, 103), the one or more manually operated valves 104, and the removable ultrasonic wireless flow meters 105 to collect data throughout a facility. For example, facility equipment may include various hardware components, such as heat exchangers, pumps, valves, compressors, production traps, knockout vessels, desalters, loading racks, and storage tanks among various other types of hardware components. In some embodiments, the control system 101 may include a programmable logic controller that may control fluid levels, pipe pressures, warning alarms, pressure releases and/or various hardware components throughout a facility. Thus, a programmable logic controller may be a ruggedized computer system with functionality to withstand vibrations, extreme temperatures, wet conditions, and/or dusty conditions, such as those around a refinery or drilling rig. Furthermore, a control system may be a computer system similar to the computer system (502) described in FIG. 5 and the accompanying description.

In some embodiments, the control system 101 includes a distributed control system (DCS). A distributed control system may be a computer system for managing various processes at a facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Figure 3:
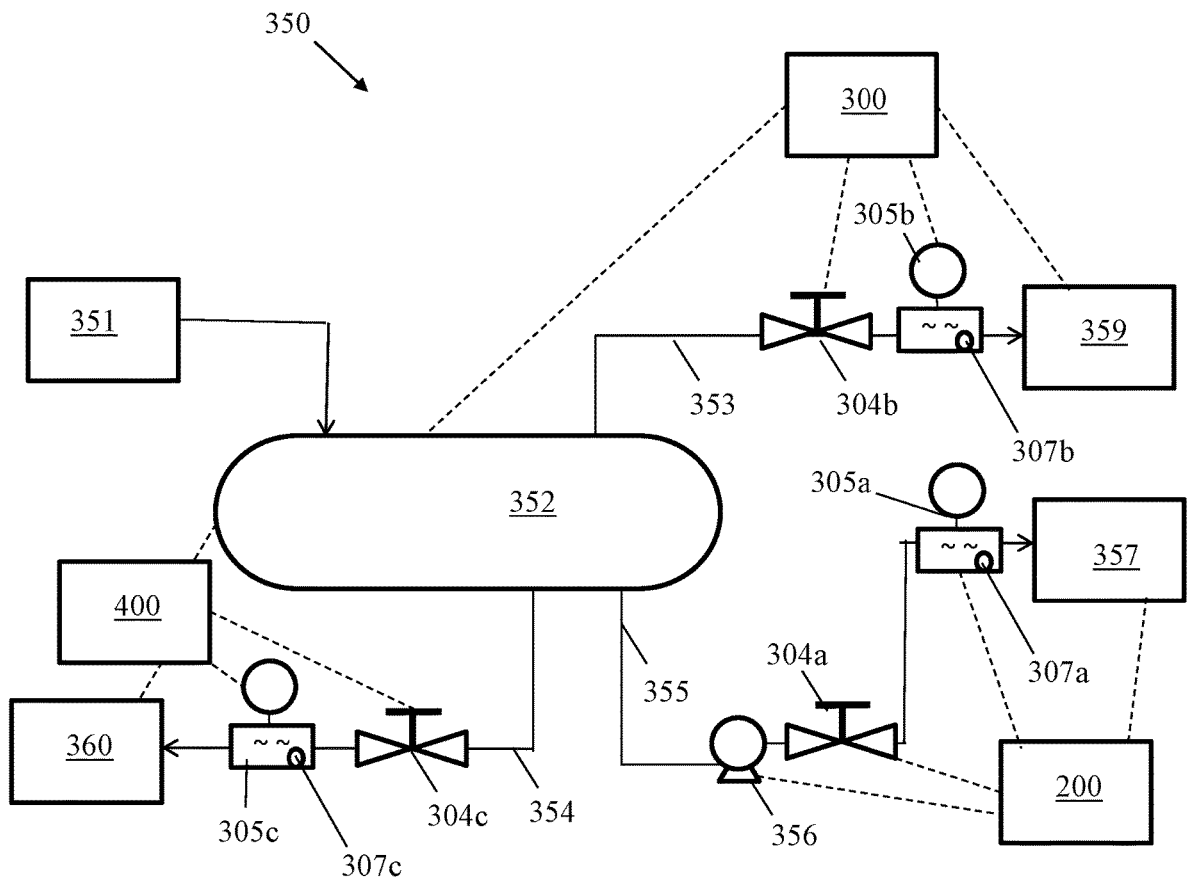

Turning to FIG. 3, FIG. 3 shows a schematic diagram of a piping circuit 350 in accordance with one or more embodiments. The piping circuit 350 may include various equipment. However, one skilled in the art would understand the present disclosure is not limited to just the various piping equipment shown in FIG. 3 without departing the present scope of the disclosure. For example, the piping circuit 350 includes an upstream processing unit 351 that injects fluids into a stripper feed separator 351. The stripper feed separator 352 separates the fluids from the upstream processing unit 351 into gas components and liquid components, such as a gas stream 353, a water stream 354, and a condensate stream 355 (e.g., hydrocarbon liquids). For example, the stripper feed separator 352 may be a three-phase separator that includes various hardware components, such as a deflector, a water retention baffle, various compartments, etc. The fluids from the upstream processing unit 351 may be a wet crude oil that enters the stripper feed separator 352, the wet crude oil may separate into various outputs, e.g., off-gas (the gas stream 353), processed wet crude oil (the condensate stream 355 such as a wet crude oil output that may still include some water and gas), and oily water (the water stream 354 such as an oily water output that may include produced water with some remaining crude oil).

The condensate stream 355 may include a pump 356 to pump the hydrocarbon liquids to a stripping column 357. A first manually operated valve 304a may be provided to control a flow of fluids from the pump 356 to the stripping column 357. Further, the first manually operated valve 304a may be a closure element with hardware for opening and closing a conduit connection of the condensate stream 355, such as a gate valve, a shutoff valve, a ball valve, a control valve, etc. Additionally, downstream of the first manually operated valve 304a, a first removable ultrasonic wireless flow meter 305a with a light 307a is provided on piping before the stripping column 357. The stripping column 357 may be used to strip, with air or steam, total reduced sulfur and other hazardous compounds from the condensate stream 355.

The gas stream 353 includes a second manually operated valve 304b to control a flow of fluids from the stripper feed separator 352 to a dehydration unit 359. Additionally, downstream of the second manually operated valve 304b, a second removable ultrasonic wireless flow meter 305b with a light 307b is provided on piping before the dehydration unit 359. The dehydration unit 359 removes water vapor from the gas stream 353 to prevent hydrate formation. For example, a wet gas of the gas stream 353 contacts dry glycol within the dehydration unit 359, and the glycol absorbs water from the gas stream 353. Further, the second manually operated valve 304b may be a closure element with hardware for opening and closing a conduit connection of the gas stream 353, such as a gate valve, a shutoff valve, a ball valve, a control valve, etc.

The water stream 354 includes a third manually operated valve 304c to control a flow of fluids from the stripper feed separator 352 to an oily water system 360 (e.g., water treatment tank). Additionally, downstream of the third manually operated valve 304c, a third removable ultrasonic wireless flow meter 305c with a light 307c is provided on piping before the oily water system 360. The oily water system 360 may include a treatment system to treat the water stream 354 and reduce pollutants to acceptable levels for wastewater. Additionally, through various water treatments, the water stream 354 may be reused. Further, the third manually operated valve 304c may be a closure element with hardware for opening and closing a conduit connection of the water stream 354, such as a gate valve, a shutoff valve, a ball valve, a control valve, etc.

Still referring to FIG. 3, the piping circuit 350 may include one or more virtual actuation measuring systems (e.g., a first virtual actuation measuring system 200, a second virtual actuation measuring system 300, and a third virtual actuation measuring system 400) that include functionality for determining the optimum time and speed to open or close the one or more manually operated valves (304a-304c). The first virtual actuation measuring system 200 is coupled to the condensate stream 355, the second virtual actuation measuring system 300 is coupled to the gas stream 353, and the third virtual actuation measuring system 400 is coupled to the water stream 354. The first virtual actuation measuring system 200, the second virtual actuation measuring system 300, and the third virtual actuation measuring system 400 are similar to the virtual flow measuring system 100 as described in FIG. 2. For example, the first virtual actuation measuring system 200 is in communication with the first manually operated valve 304a and the first removable ultrasonic wireless flow meter 305a. The second virtual actuation measuring system 300 is in communication with the second manually operated valve 304b and the second removable ultrasonic wireless flow meter 305b. The third virtual actuation measuring system 400 is in communication with the third manually operated valve 304c and the third removable ultrasonic wireless flow meter 305c. By having the first virtual actuation measuring system 200, the second virtual actuation measuring system 300, and the third virtual actuation measuring system 400, sudden flow variations in the gas stream 353, the water stream 354, and the condensate stream 355, are avoided and do not need internal flowmeters which require piping modification, instrumentation and cables, and unit shutdown which can be expensive.

In some embodiments, during operation of the piping circuit 350, the first virtual actuation measuring system 200, the second virtual actuation measuring system 300, and the third virtual actuation measuring system 400 collects and records data from the removable ultrasonic wireless flow meters (305a-305c). The data includes, for example, a record of flow rates in the corresponding stream (the gas stream 353, the water stream 354, and the condensate stream 355). In some embodiments, the measurements are recorded in real-time, and are available for review or use within seconds, minutes or hours of the condition being sensed (e.g., the measurements are available within 1 hour of the condition being sensed). In such an embodiment, the data may be referred to as "real-time" data. Real-time data may enable an operator of the piping circuit 350 to assess a relatively current state of the fluids within the stripper feed separator 352 and make real-time decisions regarding fluid flow within the piping circuit 350.

In some embodiments, the first virtual actuation measuring system 200, the second virtual actuation measuring system 300, and the third virtual actuation measuring system 400 may include a control system or other computer device that acquires sensor measurements from the removable ultrasonic wireless flow meters (305a-305c) with respect to a predetermined plant environment. Based on knowledge of this plant environment, a virtual actuation measuring system may determine the actuate the corresponding manually operated valves (304a-304c) at a particular location in the piping circuit 350 without using needing human visual inspection. In some embodiments, for example, a virtual actuation measuring system uses a predictive model to determine the optimum time and speed to actuate the corresponding manually operated valves (304a-304c).

While FIGS. 2 and 3 shows various configurations of components, other configurations may be used without departing from the scope of the disclosure. For example, various components in FIGS. 2 and 3 may be combined to create a single component. As another example, the functionality performed by a single component may be performed by two or more components.

Figure 4:
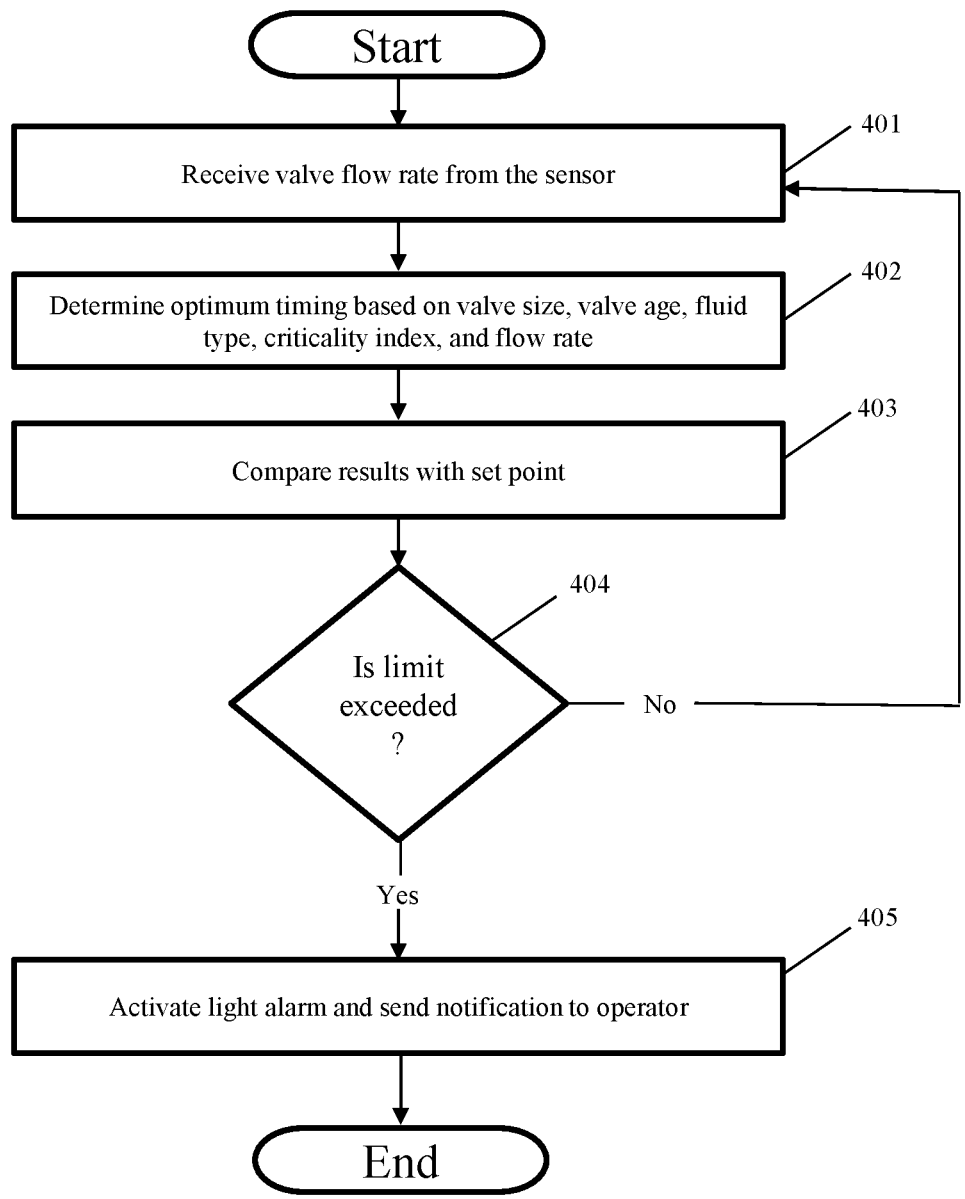
FIG. 4 illustrates a flowchart in accordance with one or more embodiments of the present disclosure.

Turning to FIG. 4, FIG. 4 shows a flowchart in accordance with one or more embodiments. Specifically, FIG. 4 describes a general method for virtual flow actuation sensing. One or more blocks in FIG. 4 may be performed by one or more components (e.g., virtual actuation measuring system 200, 300, 400) as described in FIGS. 2 and 3. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 401, flow rate data are obtained regarding a removable ultrasonic wireless flow meter downstream a manually operated valve in accordance with one or more embodiments. For example, fluid flow may pass through piping on which the removable ultrasonic wireless flow meter is coupled therein, where upstream and downstream may be determined with respect to the particular manually operated valve. The particular manually operated valve may refer to a particular section of processing pipe with a valve with constant physical dimensions that are proximate upstream the removable ultrasonic wireless flow meter.

In Block 402, an optimum timing to actuate the particular manually operated valve is determined based on a predictive model. The predictive model also uses a regression model to calculate corresponding coefficient of the various input parameters (for example, valve size 111, valve age 112, fluid type 113, criticality index 114, and flow rate 115). In particular, various systematic rules may be applied to the various input parameters (for example, valve size 111, valve age 112, fluid type 113, criticality index 114, and flow rate 115) to determine the optimum timing to actuate the particular manually operated valve. For example, the predictive model may correspond to Equation 1 described above with respect to an optimum timing to actuate the particular manually operated valve. In some embodiments, the predictive model may be an algorithmic black box, such as a trained artificial neural network, where an optimum timing is based on input values corresponding to the various input parameters (for example, valve size 111, valve age 112, fluid type 113, criticality index 114, and flow rate 115) and corresponding coefficients.

In Block 403, the measured flow rate is compared with set points of the determined optimum timing. For example, the set point may be a predetermined flow rate based on the optimum timing. If the measured flow rate does not exceed the limit, the method restarts back at Block 401 for continued monitoring. However, as shown in Block 405, if the measured flow rate does exceed the limit, a light alarm of the removable ultrasonic wireless flow meter is activated and a notification is sent to an operator. For example, the light of the removable ultrasonic wireless flow meter may start to flash to be visually spotted. Additionally, a transmitter of the removable ultrasonic wireless flow meter sends the alert for the operator to conduct an actuation operation avoiding flow fluctuations.

Figure 5:
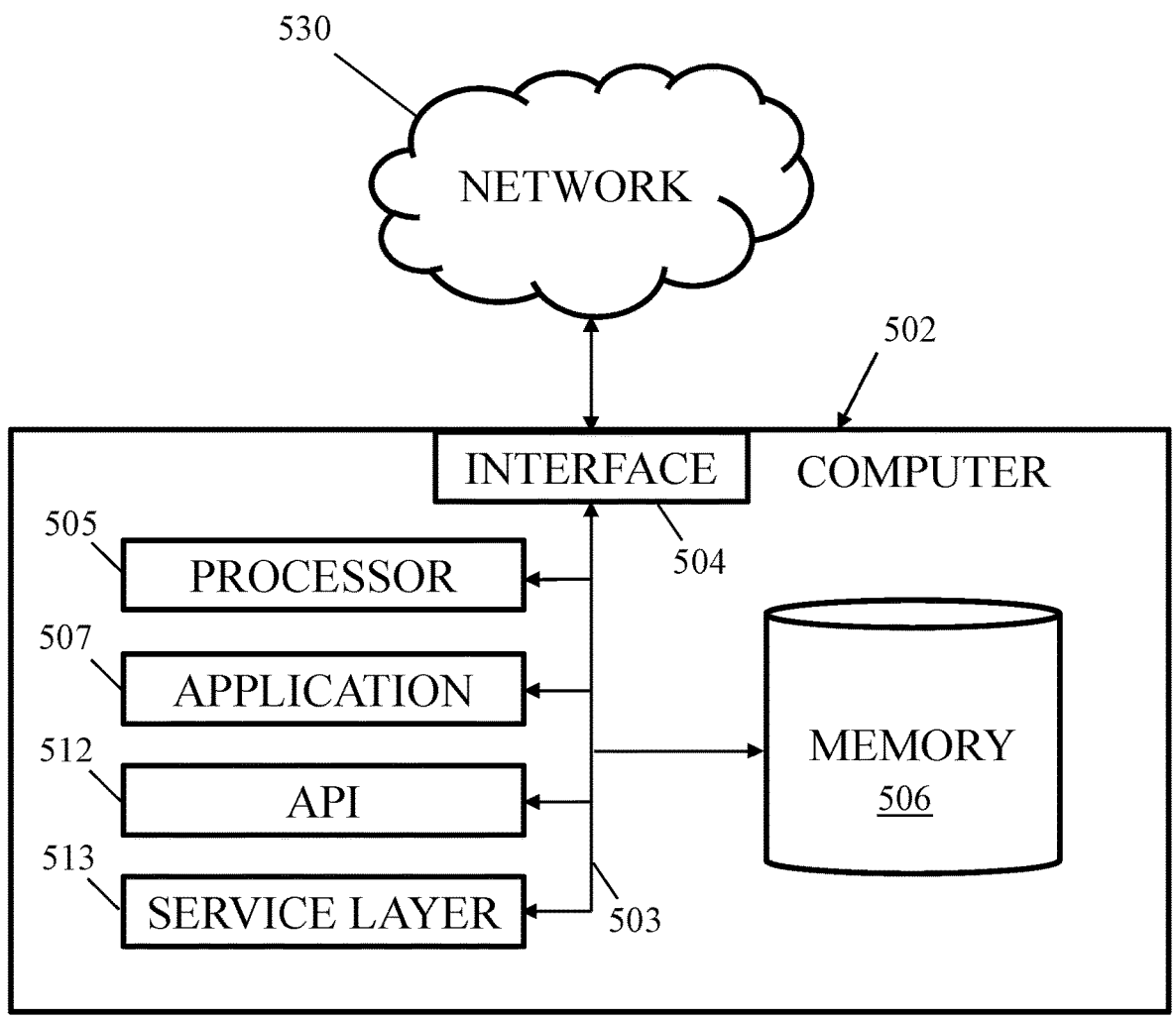
FIG. 5 illustrates a computer system in accordance with one or more embodiments.

Embodiments may be implemented on a computer system. FIG. 5 is a block diagram of a computer system 502 used to provide computational functionalities associated with described algorithms, methods, functions, processes, flows, and procedures as described in the instant disclosure, according to an implementation. The illustrated computer 502 is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may include a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513. The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502.

The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530. Generally, the interface 504 includes logic encoded in software or hardware (or a combination of software and hardware) and operable to communicate with the network 530. More specifically, the interface 504 may include software supporting one or more communication protocols associated with communications such that the network 530 or interface's hardware is operable to communicate physical signals within and outside of the illustrated computer 502.

The computer 502 includes at least one computer processor 505. Although illustrated as a single computer processor 505 in FIG. 5, two or more processors may be used according to particular needs, desires, or particular implementations of the computer 502. Generally, the computer processor 505 executes instructions and manipulates data to perform the operations of the computer 502 and any algorithms, methods, functions, processes, flows, and procedures as described in the instant disclosure.

The computer 502 also includes a memory 506 that holds data for the computer 502 or other components (or a combination of both) that can be connected to the network 530. For example, memory 506 can be a database storing data consistent with this disclosure. Although illustrated as a single memory 506 in FIG. 5, two or more memories may be used according to particular needs, desires, or particular implementations of the computer 502 and the described functionality. While memory 506 is illustrated as an integral component of the computer 502, in alternative implementations, memory 506 can be external to the computer 502.

The application 507 is an algorithmic software engine providing functionality according to particular needs, desires, or particular implementations of the computer 502, particularly with respect to functionality described in this disclosure. For example, application 507 can serve as one or more components, modules, applications, etc. Further, although illustrated as a single application 507, the application 507 may be implemented as multiple applications 507 on the computer 502. In addition, although illustrated as integral to the computer 502, in alternative implementations, the application 507 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

In some embodiments, the computer 502 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

In addition to the benefits described above, the virtual actuation measuring system may improve an overall efficiency and performance at the plant while reducing cost and risk of non-productive time (NPT), and many other advantages. Further, the virtual actuation measuring system may provide further advantages such as being able to decrease maintenance and operating cost, prevent any unwanted flow fluctuations, reduce human errors, process upsets and piping movement (displacement from its anchor supported points), and is not limited to any type of fluid (e.g., hydrocarbon, water, steam, nitrogen, and other fluids in either vapor or liquid phase).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A system, comprising:
   upstream process equipment of a piping circuit;
   downstream process equipment of the piping circuit, wherein the upstream process equipment is configured to transmit a predetermined fluid to the downstream process equipment for processing;
   a valve provided on piping between the upstream process equipment and the downstream process equipment, the valve fluidly coupling the upstream process equipment to the downstream process equipment;
   a removable ultrasonic wireless flow meter coupled to the piping downstream from the valve; and
   a control system coupled to the valve and the removable ultrasonic wireless flow meter,
   wherein the control system determines a time and speed to actuate the valve using a predictive model based on a valve size of the manually operated valve, a valve age of the valve, fluid type, a performance metrics when the valve is actuated, a measured flow rate from the removable ultrasonic wireless flow meter, and corresponding coefficients.

2. The system of claim 1, wherein the control system cross-correlates the determined time and speed with an actual time and speed actuation of the valve, and the control system send an alert if the actual time and speed is deviated from the determined time and speed.

3. The system of claim 1, wherein the removable ultrasonic wireless flow meter comprises a light configured to flash when the measured flow rate exceeds a predetermined limit.

4. The system of claim 3, wherein the removable ultrasonic wireless flow meter comprises a transmitter configured to send a notification to an operator.

5. The system of claim 1, wherein the control system calculates the corresponding coefficients using a regression model.

6. The system of claim 1, wherein the control system is a distributed control system (DCS).

7. A method, comprising:
   obtaining, by a control system, a flow rate measured from a removable ultrasonic wireless flow meter downstream of a valve;
   determining, by the control system, a time and speed to actuate the valve based on a predictive model based on a valve size of the manually operated valve, a valve age of the valve, fluid type, a performance metrics when the valve is actuated, a measured flow rate from the removable ultrasonic wireless flow meter, and corresponding coefficients; and
   comparing, by the control system, the measured flow rate set points of the determined time and speed,
   wherein if the measured flow rate does exceed a predetermined limit, activating a light of the removable ultrasonic wireless flow meter and sending a notification to an operator.

8. The method of claim 7, further comprising:
   flashing, by the control system, the light on the removable ultrasonic wireless flow meter.

9. The method of claim 7, wherein the notification is an alert.

10. The method of claim 9, further comprising:
    sending, with a transmitter of the removable ultrasonic wireless flow meter, the notification to the operator to conduct an actuation operation avoiding flow fluctuations.

11. The method of claim 7, wherein if the measured flow rate does not exceed the predetermined limit, the control system continuing to monitor a flow rate through the valve.

12. The system of claim 1, wherein the upstream process equipment is a stripper feed separator or a pump and the downstream process equipment is a stripping column, wherein the predetermined fluid is a condensate stream.

13. The system of claim 1, wherein the upstream process equipment is a stripper feed separator and the downstream process equipment is a dehydration unit, wherein the predetermined fluid is a gas stream.

14. The system of claim 1, wherein the upstream process equipment is a stripper feed separator and the downstream process equipment is an oily water system, wherein the predetermined fluid is a water stream.

15. The system of claim 1, wherein the valve is a gate valve, a shutoff valve, a ball valve, or a control valve.

* * * * *